United States Patent
Yoshikawa et al.

[11] Patent Number: 6,080,442
[45] Date of Patent: Jun. 27, 2000

[54] MANNOSE-CONTAINING FEED AND PROCESS FOR PRODUCING THE SAME

[75] Inventors: Genichi Yoshikawa; Akemi Morimoto; Munehiko Dombo, all of Kyoto-fu, Japan

[73] Assignee: Unitika Ltd., Hyogo, Japan

[21] Appl. No.: 09/147,938

[22] PCT Filed: Aug. 4, 1998

[86] PCT No.: PCT/JP98/03450

§ 371 Date: Mar. 24, 1999

§ 102(e) Date: Mar. 24, 1999

[87] PCT Pub. No.: WO99/08544

PCT Pub. Date: Feb. 25, 1999

[30] Foreign Application Priority Data

Aug. 15, 1997 [JP] Japan ................... 9-220319

[51] Int. Cl.[7] .................. A23K 1/00; A23K 1/18
[52] U.S. Cl. ............... 426/617; 426/53; 426/635; 426/807
[58] Field of Search .................. 426/635, 807, 426/53, 617

[56] References Cited

U.S. PATENT DOCUMENTS 5,429,828  7/1995  Fodge et al. ................... 426/18

FOREIGN PATENT DOCUMENTS

| 59045833 | 3/1984 | Japan . |
| 7-236429 | 9/1995 | Japan . |
| 8-38064 | 2/1996 | Japan . |
| 11018791 | 1/1999 | Japan . |
| 11137288 | 5/1999 | Japan . |
| 2215980 | 10/1989 | United Kingdom . |

*Primary Examiner*—Chhaya D. Sayala
*Attorney, Agent, or Firm*—Wenderoth, Lind & Ponack, L.L.P.

[57] ABSTRACT

Mannose-containing copra meal characterized in that mannose in the copra meal has been degraded in whole or in part to mannose, a process for producing such copra meal and a mannose-containing feed which contains the mannose-containing copra meal.

4 Claims, 1 Drawing Sheet

Days after salmonella administration

MANNOSE-CONTAINING FEED AND PROCESS FOR PRODUCING THE SAME

BACKGROUND OF THE INVENTION

1. Field of the Invention

The present invention relates to mannose-containing feed which has excellent handling properties and which can be produced at low cost, and to a process for producing such feed.

2. Description of the Prior Art

Although industrial waste problems have been social issues for many years, a promising clue for solving the problems has not yet been found in spite of extensive efforts in various fields. Food wastes discharged from food processing factories are residues resulting from processes in which non-digestible and/or distasteful materials are removed from raw materials, and specific useful constituents are recovered for use. Since such residues contain protein, carbohydrate, fat, cellulose and the like, many of food wastes such as brewer's grains, bean curd refuse, bran, and crushed orange lees are currently used as feed. Many of these food wastes, however, have a drawback in that their shelf life are short because of their high water contents. Furthermore, the appreciation of the yen promotes import of cheap feed from abroad, and there is a trend for dairy farmers in Japan to rely on such imported feed which is more easy to handle.

Copra meal, a ground product of extraction residue of coconut oil, is also mostly used in Japan as feed for cattle and swine. However, copra meal as such has a drawback in that it is not suitable as feed for fowl because it contains a rather large amount of fiber and its amino acid composition is not quite acceptable ("Shiryo-No-Kiso-Chishiki", Toyo Keizai Shinpo, p. 58 (1970)).

Meanwhile, mannose has proved to have an effect on preventing harmful bacterial infection via intestinal tract, and feed which contains mannose as an ingredient for preventing infection has been proposed (Japanese Patent Publication No. H8(1996)-38064 A).

Mannose is heretofore produced by acidic or enzymatic degradation of glucomannan contained in, for example, wood or bulb of konjak or galactomannan contained in, for example, guar gum.

However, since the process for extracting various mannans from natural sources requires complicated procedures and high costs, feed which contains mannose thus produced has a drawback of being expensive. In addition, since mannose thus produced is in the form of powder or aqueous solution, it has another drawback in that it is difficult to mix mannose uniformly with feed. Furthermore, the process for extracting mannan produces a large amount of waste residue. Since this residue is not suitable for use as feed because it no longer contains useful constituents such as amino acids or sugars, it also causes additional industrial waste problems.

SUMMARY OF THE INVENTION

The present invention provides mannose-containing feed which has excellent handling properties and which can be produced easily and at low cost by using copra meal, and also provides a process for producing such feed.

DESCRIPTION OF THE PREFERRED EMBODIMENTS

Figure 1:
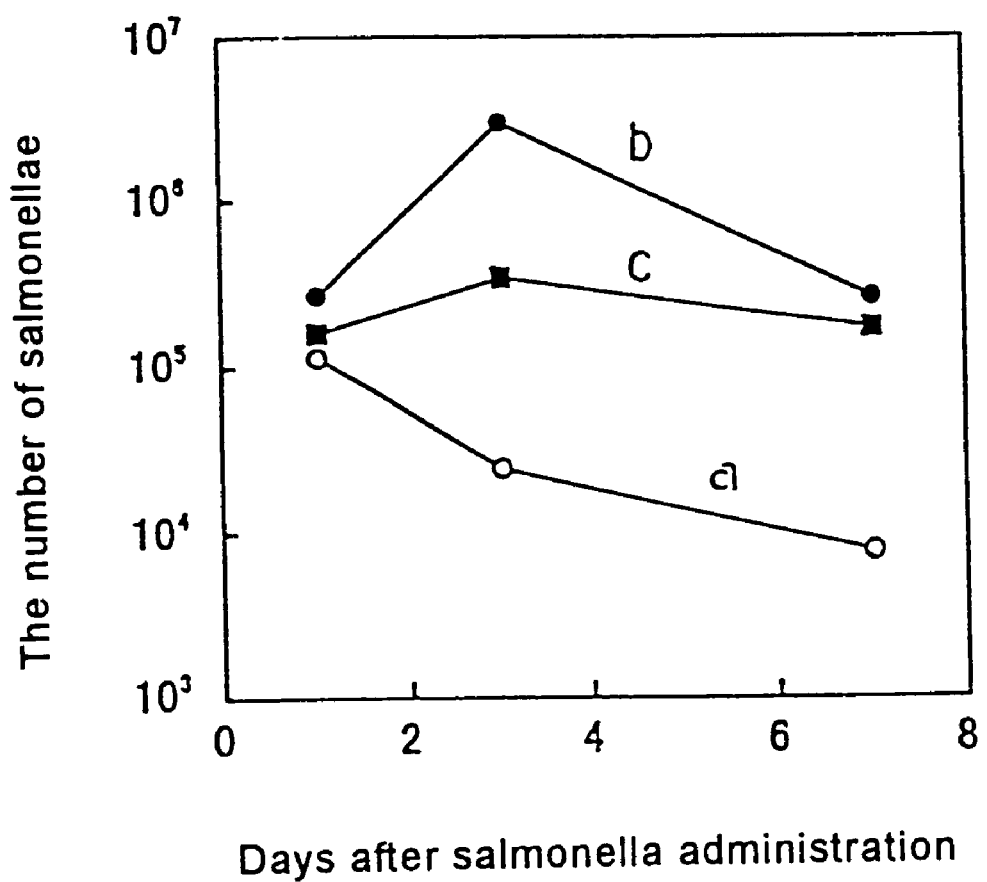
FIG. 1 shows the results of measurement in which the number of salmonellae in cecal feces after forced oral administration of salmonella was determined at various times in (a) fowls received the feed of the present invention, compared with those results obtained in (b) fowls received formula feed supplemented usual copra meal without any enzymatic treatments or (c) fowls received only the base formula feed.

The present inventors have found that mannose-containing copra meal which is obtained by degrading at least part of mannan in copra meal to mannose is quite useful as mannose-containing feed because it exhibits excellent handling properties and can be produced easily and at low cost. The present invention has been completed on the basis of this finding.

Specifically, the first aspect of the present invention is a mannose-containing copra meal characterized in that mannan in the copra meal has been degraded in whole or in part to mannose.

In addition, the second aspect of the present invention is a process for producing a mannose-containing copra meal, characterized in that copra meal is treated with a hemicellulase solution to release mannose.

Furthermore, the third aspect of the present invention is a formula feed which contains a mannose-containing copra meal.

The present invention is further described in detail below.

The mannose-containing feed of the present invention is produced using copra meal as a raw material by degrading mannan in the copra meal in whole or in part to release mannose.

The term "copra meal" refers to a ground product of residues resulting from the process in which coconut oil is extracted from copra, the raw material for pressing coconut oil obtained by drying the pulp of coconut; and Copra meal usually contains mannan in an amount of about 30% by weight. Copra meal which may be used as a raw material for the mannose-containing feed of the present invention is not specifically restricted in regard to its origin, producing method or the like, so far as it is produced in the usual process for producing coconut oil.

Although the degradation percent of mannan in copra meal is not specifically restricted, it is preferred that 10–100% by weight, particularly 30 to 100%, of mannan has been degraded.

The water content in the mannose-containing copra meal of the present invention is preferably 5–20% by weight, and more preferably 5–13% by weight. Copra meal containing more than 20% by weight water is not preferred because it is perishable.

The mannose-containing copra meal of the present invention may be used as feed by itself or in combination with other feed ingredients.

When mixed in formula feed, it is desirable to add the mannose-containing copra meal in an amount to give a mannose content in the formula feed from 0.001 to 0.6% by weight. Thus, the mannose-containing copra meal is typically added in an amount of 0.01–2% by weight, preferably 0.1–1% by weight, of the formula feed. The added amount of mannose-containing copra meal may usually be determined in the light of its potency and economical efficiency.

The process for producing mannose-containing copra meal of the present invention is described below.

The term "hemicellulase" used in the present invention refers to an enzyme which acts on hemicellulose, polysaccharides existing in plant cell wall in association with cellulose. Hemicellulase used in the present invention is not specifically restricted so far as it acts on copra meal to release mannose, and it includes mannan degrading enzymes such as mannanase (mannase) or mannosidase. Exemplary origins of such enzymes include, for example, grass bacillus (*Bacillus subtilis*), filamentous fungi (*Aspergillus aculeatus, A. awamori, A. niger, A. usamii, Humicola insolens, Trichoderma harzianum, T. koningi, T. nongibrachiatum, T. viride*), and basidiomycete (Coriticium, *Pycnoporus coccineus*), and those enzymes of Aspergillus origin are preferable. More preferably, mannanase derived from *Aspergillus niger* is used.

These hemicellulase are obtained in culture supernatant of the above described strains or in their cell bodies, and any fractions containing such hemicellulase may be used in the present invention. If necessary, the fraction containing hemicellulase may be purified or partially purified before use.

Alternatively, commercially available enzymes such as Cellulosin HC100, Cellulosin HC, Cellulosin TP25, Cellulosin GM5 (all manufactured by Hankyu Bio Industry), Sumizyme AC, Sumizyme ACH (all manufactured by Shin Nihon Kagaku Kogyo), and Gamanase (manufactured by Novo Nordisk Industry) may also be used.

Hemicellulase solution as used herein is not specifically restricted so far as it contains hemicellulase as described above, and it may be, for example, a solution in which such hemicellulase is suspended in water.

The amount of enzyme with which copra meal is treated is preferably 1–100 units per 1 gram of copra meal, and more preferably 10–50 units per 1 gram of copra meal. Preferably, the enzyme concentration is so adjusted that the required amount of enzyme solution may be 3-fold or less by weight relative to copra meal, and more preferably be 0.5- to 3-fold, particularly 1- to 2-fold. When more than 3-fold amount of enzyme solution is used, water content in the copra meal will so increase that propagation of various bacteria is promoted, and therefore the copra meal will be unsuitable as feed for use as such. In addition, said amount is unpreferable because it requires a lot of labor and costs to reduce the water content to an appropriate value for use as feed. Although the amount less than 0.5-fold does not cause serious problems, such amount is not preferred since the amount of released mannose is not increased so much because the enzyme solution can not uniformly contact the copra meal.

Preferably, copra meal is brought into uniform contact with the enzyme solution by using a method, for example, in which the enzyme solution is added to copra meal and the mixture is immediately stirred, or in which copra meal is added into a container containing the enzyme solution and the mixture is immediately stirred, or in which copra meal is dispersed onto a flat surface and then the enzyme solution is uniformly sprayed thereover using any one of various atomizers. For industrial purpose, blenders such as kneader, ribbon mixer, and Nauta mixer (manufactured by Hosokawa Micron or Dalton) may be used.

Although conditions usually used for an enzymatic reaction may be acceptable, copra meal is preferably treated with the enzyme solution under the optimum conditions for the enzyme used. The reaction is preferably carried out under a temperature condition which does not inactivate the enzyme and which represses propagation of microorganisms in order to prevent rot of the reaction solution. Thus, the reaction temperature may be 20–90° C., preferably 40–80° C., and more preferably 50–75° C. Although the reaction time depends on the amount of enzyme used, it is usually preferred in view of working efficacy to adopt a duration from 3 hours to 24 hours.

According to the present invention, it is preferred to dry the mannose-containing copra meal thus obtained until the water content reaches 5–20% by weight, and more preferably 5–13% by weight.

The feed may be dried by means of a vacuum dryer, vacuum agitating dryer, drum dryer, conveyor band dryer, flash dryer, fluidized bed dryer, or the like. The temperature during the drying process is suitably maintained at 60–140° C. and more preferably at 80–120° C. in order to repress propagation of various bacteria and not to decompose mannose.

EXAMPLES

The present invention is further illustrated by the following examples.

Example 1

To 100 g of copra meal (mannan content 30%, fat content 10%, water content 7.2%), 0.3 g of Cellulosin GM5 (mannanase manufactured by Hankyu Bio Industry; titer, 10,000 units/g) suspended in 100 ml of water (an equal amount by weight relative to copra meal) was uniformly sprayed and then incubated at 60° C. for 12 hours. After completion of the reaction, the product was vacuum-dried at 80° C. for 5 hours in a vacuum dryer (Vacuum Drying Oven DP32 manufactured by Yamato) to obtain a mannose-containing feed.

This feed was then suspended in water to dissolve sugar constituents in the feed into water, and the sugar constituents in the resulting solution were quantified using high performance liquid chromatography. For analysis, BioRad Aminex HPX-87P column was used at the column temperature of 85° C. and at the flow rate of 0.6 ml/min. Sugars were detected using a differential refractometer, and the mannose content was determined on the basis of the values obtained with authentic samples. In result, it was found that 13 g of mannose has been accumulated in 100 g of the feed. In addition, it was also found that the water content in the feed measured by heat-drying at normal pressure was 7.0%.

Example 2

To 100 g of copra meal (mannan content 30%, fat content 10%, water content 7.2%), 0.1 g of Sumizyme ACH (hemicellulase manufactured by Shin Nihon Kagaku Kogyo; titer, 50,000 units/g) suspended in 130 ml of water (a 1.3-fold amount by weight relative to copra meal) was uniformly sprayed and then incubated at 50° C. for 15 hours. After completion of the reaction, the product was vacuum-dried at 90° C. for 10 hours in a vacuum dryer (Vacuum Drying Oven DP32 manufactured by Yamato) to obtain a mannose-containing feed. Sugars in this feed were quantified in the same manner as described in Example 1, and it was found that 15 g of mannose has been accumulated in 100 g of the feed. It was also found that the water content was 6.5%.

Example 3

To 1 kg of copra meal (mannan content 30%, fat content 10%, water content 7.2%), 0.5 L of 1.8N HCl was added, and the mixture was stirred for 5 minutes using a universal mixer (manufactured by Sanei Seisakusho). The pH of the mixture was 3.0. To this mixture, 0.5 g of Cellulosin GM5 (mannanase manufactured by Hankyu Bio Industry; titer, 10,000 units/g) and 0.5 g of Sumizyme ACH (hemicellulase manufactured by Shin Nihon Kagaku Kogyo; titer, 50,000 units/g) suspended in 1 L of water (an equal amount by weight relative to copra meal) were added, and mixed for 5 minutes. After mixing, the mixture was incubated at 60° C. for 24 hours. After completion of the reaction, the product was vacuum-dried at 100° C. for 10 hours in a vacuum dryer (Vacuum Drying Oven DP32 manufactured by Yamato) to obtain a mannose-containing copra meal. Sugars in this copra meal were quantified in the same manner as described in Example 1, and it was found that 11 g of mannose has been accumulated in 100 g of the copra meal. It was also found that the water content was 10.0%.

Performance evaluation of feed

Using the mannose-containing feed which contains mannose-containing copra meal prepared in Example 3, a salmonella excretion test was carried out in fowl.

Six white leghorn laying fowls (Julia) at 71-weeks old were fed ad libitum for 25 days with 0.1 kg/fowl/day (or a total feeding amount of 2.5 kg) of formula feed which has the composition shown below in the Table 1 supplemented with 1% by weight mannose-containing copra meal described above. On the 18th day after the feeding was started, 1 ml of bacterial suspension containing $8.0 \times 10^5$ cells/ml of salmonella (a wild strain of Salmonella enteritidis obtained from National Institute of Animal Health (Ministry of Agriculture, Forestry and Fisheries)) was orally administered by compulsion using catheter.

TABLE 1

Composition of the base feed

| Material | Mix proportion (% by weight) |
| --- | --- |
| Yellow corn | 69.4 |
| Bean cake | 16.0 |
| CP 65% Fish meal | 3.0 |
| Alfalfa meal | 2.0 |
| DL-Methionine | 0.1 |
| L-Lysine hydrochloride[4] | 0.1 |
| Calcium carbonate | 6.5 |
| Calcium monohydrogenphosphate | 2.0 |
| Sodium chloride | 0.3 |
| Trace mineral premix[1] | 0.2 |
| Vitamin A, D, E premix[2] | 0.2 |
| Vitamin B complex premix[3] | 0.2 |
| Total | 100 |

[1] Mn 80 g, Zn 50 g, Fe 6 g, Cu 0.6 g, and I 1 g per kg
[2] vitamin A 10,000 IU, vitamin D 32,000 IU, and vitamin E 20 mg per g
[3] thiamine mononitrate 2.0 g, riboflavin 10.0 g, pyridoxine hydrochloride 2.0 g, nicotinamide 2.0 g, calcium D-pantothenate 4.35 g, choline chloride 138.0 g, and folic acid 1.0 g per kg
[4] 98.5% preparation Cecal feces excreted on the morning of the 14th day after the feeding was started (control) and of the 1st, 3rd, and 7th days after the salmonella administration were separately sampled for each individual, and the number of salmonellae was determined as described below.

For comparison, additional salmonella excretion tests were carried out in the same manner as described above with the exception that formula feed supplemented 1% of the copra meal without any enzymatic treatments (Reference Example 1) or only the base formula feed (Reference Example 2) was used in place of the above mannose-containing feed.

The results are shown in FIG. 1. In the figure, "a" indicates the number of salmonellae in cecal feces from fowls received the feed of the present invention, "b" indicates corresponding values for fowls received formula feed supplemented copra meal without any enzymatic treatments, and "c" indicates corresponding values for fowls received only the base formula feed.

FIG. 1 shows the results of the salmonella excretion tests on fowl with the ordinate indicating the logarithmic value of the number of excreted salmonellae and the abscissa indicating the time after the salmonella administration in days.

The results indicate that the mannose-containing feed of the present invention has a salmonella-excreting effect.

<Method for measuring the number of salmonellae>

One gram of cecal feces was diluted 10-fold with sterilized phosphate buffered physiological saline and thoroughly mixed to give a stock solution. The stock solution was then diluted stepwise with a common ratio of 10 using sterilized physiological saline to prepare 100-fold and 1000-fold diluted solutions.

Each 0.1 ml of the stock solution, 100-fold and 1000-fold diluted solutions was inoculated separately onto SS agar plates and Brilliant Green agar plates, incubated at 37° C. for 24 hours, and then the typical colonies grown on each plate were measured. Furthermore, bacteria picked up from the colonies were inoculated on SIM Agar and TSI Agar (a modified Crigler medium used for verification of enterobacteria) for lysine decarboxylation test, and incubated at 37° C. for 24 hours to check their properties. The colony which was confirmed as salmonella was then checked for its serotype using salmonella antiserums. The number of salmonellae per 1 gram of the sample was then calculated by multiplying the number of colonies which were confirmed as Salmonella O9 group by the dilution ratio of the stock solution or the diluted solution.

The mannose-containing feed of the present invention is a useful feedstuff, since it contains mannose which is receiving attention as an ingredient for preventing salmonella infection.

In addition, since the feed according to the present invention is produced using copra meal as a raw material, the present invention is also useful as a solution for the industrial wastes problems.

Furthermore, according to the process of the present invention, such mannose-containing feed can be produced easily and at low cost.

What is claimed is:

1. A process for producing a mannose-containing copra meal comprising treating each 1 g of copra meal with 1–100 units hemicellulase solution of a 3-fold or less amount by weight relative to copra meal, to release mannose contained in the copra meal.

2. A mannose-containing feed comprising a mannose-containing copra meal in an amount of 0.01–2% by weight of the whole feed, said mannose-containing copra meal containing 3–30% by weight of mannose obtained by degrading at least part of mannan in the copra meal.

3. A process for producing mannose-containing feed comprising treating copra meal with a hemicellulase solution of a 3-fold or less amount by weight relative to copra meal, to release mannose contained in the copra meal, and obtain the mannose-containing feed.

4. A process for producing mannose-containing feed comprising adding mannose-containing copra meal to a feed to produce the mannose-containing feed, said mannose-containing copra meal obtained by treating copra meal with a hemicellulase solution of a 3-fold or less amount by weight relative to copra meal, to release mannose contained in the copra meal.

* * * * *

(12) EX PARTE REEXAMINATION CERTIFICATE (7057th)
United States Patent
Yoshikawa et al.

(10) Number: US 6,080,442 C1
(45) Certificate Issued: Sep. 15, 2009

(54) MANNOSE-CONTAINING FEED AND PROCESS FOR PRODUCING THE SAME

(75) Inventors: Genichi Yoshikawa, Kyoto-fu (JP); Akemi Morimoto, Kyoto-fu (JP); Munehiko Dombo, Kyoto-fu (JP)

(73) Assignee: Unitika Ltd., Amagasaki-Shi, Hyogo (JP)

Reexamination Request:
No. 90/008,507, Apr. 3, 2007

Reexamination Certificate for:
Patent No.: 6,080,442
Issued: Jun. 27, 2000
Appl. No.: 09/147,938
Filed: Mar. 24, 1999

(22) PCT Filed: Aug. 4, 1998

(86) PCT No.: PCT/JP98/03450
§ 371 (c)(1),
(2), (4) Date: Mar. 24, 1999

(87) PCT Pub. No.: WO99/08544
PCT Pub. Date: Feb. 25, 1999

(30) Foreign Application Priority Data
Aug. 15, 1997 (JP) .............................................. 9-220319

(51) Int. Cl.
*A23K 1/165* (2006.01)
*A23K 1/16* (2006.01)

(52) U.S. Cl. ........................ 426/617; 426/53; 426/635; 426/807

(58) Field of Classification Search ........................ None
See application file for complete search history.

(56) References Cited

U.S. PATENT DOCUMENTS 6,080,442 A 6/2000 Yoshikawa et al.

FOREIGN PATENT DOCUMENTS

| JP | 7-236429 A | 9/1995 |
| JP | 8-38064 A | 2/1996 |
| JP | 8-173055 A | 7/1996 |

OTHER PUBLICATIONS

"Biochemical Dictionary," $2^{nd}$ Edition, Tokyo Kagaku Dojin, 1990, p. 1303 (partial English translation).*
A. F. Zamora et al., Metabolizable Energy of Mannase Treated Copra Meal (MTCM) and Growth Performance of Broilers Fed with MTCM, The Philippine Journal of Biotechnology vol. 7, No. 1, 15–24, published Jun. 1996.
Gwl Gun Park et al., A New Method for the Preparation of • 1,4–Mannotriose from Brown Copra Meal Using the Crude Enzyme from *Penicillium purpurogenum*, Japan, J. Trop. Agr. 32 (4): 208–214, published 1988.
Isao Kusakabe et al., Studies on the Mannanase of *Streptomyces*, Japan, J. Trop. Agr. 29(3):167–172, published in 1985.
R. Takahashi et al., "Studies on Mannanase of *Actinomycetes*", Japan J. Trop. Agr., vol. 27, No. 3, pp. 140–148, 1983.
T. Yamamoto et al., "Isolation of a β–Mannan Hydrolyzing Enzyme and Hydrolysis of Guar Gum by the Enzyme Isolated", Denpun Kagaku, vol. 37, No. 2, pp. 99–105, 1990.
M. Zama et al., "Enzymatic Preparation of Crystalline Mannose from Copra Mannan", Japan J. Trop. Agr., vol. 29, vol. 4, pp. 221–225, 1985.
"Enzyme Handbook", $1^{st}$ Edition, Asakura Publishing, 1982, p. 502 (partial English translation).
Japanese Patent Laid–Open No. 8–038064 published on Feb. 13, 1996 to Nakamura et al (partial English translation).

(Continued)

*Primary Examiner*—Dwayne C Jones

(57) ABSTRACT

Mannose-containing copra meal characterized in that mannose in the copra meal has been degraded in whole or in part to mannose, a process for producing such copra meal and a mannose-containing feed which contains the mannose-containing copra meal.

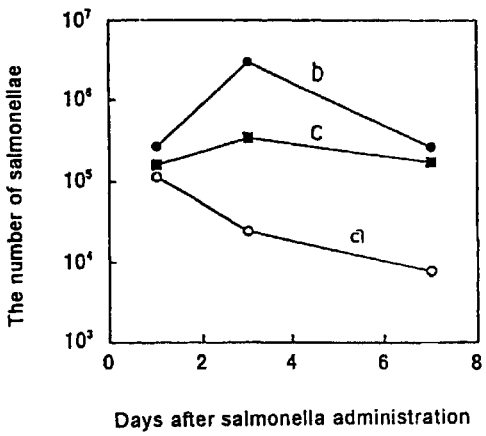

OTHER PUBLICATIONS

Japanese Patent Laid–Open No. 7–236429 published on Sep. 12, 1995 to Hoshida et al (English translation).

"Japan Standard Feed Ingredient List", Japan Livestock Industry Association, 1975, pp. 77–79, 124, 130 (partial English translation).

Brochure of "Mannose–containing Feed Cocco–Ace", presented by Unitika, total 2 pages (partial English translation).

"Enzyme Handbook", $1^{st}$ Edition, Asakura Publishing, 1982, p. 502 and 518 (partial English translation).

"Biochemical Dictionary", $3^{rd}$ Edition, Tokyo Kagaku Dojin, 1998, pp. 1364–1365 (partial English translation).

"Segregation—Utilization Technology of Values from Wastes in Food Industry", Food Industry Eco–Process Technique Research Association, 1996, pp. 1–9 (partial English translation).

Japanese Patent Laid Open No. 63–309196 published on Dec. 16, 1988 to Kusakabe et al (partial English translation).

Japanese Patent Laid Open No. 63–209586 published on Aug. 31, 1988 to Murakami et al (partial English translation).

Brochure of "Plant Tissue Breakdown Enzyme Preparation", presented by Hankyu Bioindustry, extract 9 pages in total (partial English translation).

Brochure of "Hemicellulase (Galactomannanase) Sumichiim ACH", presented by Shin Nihon Chemical, extracted 5 pages in total (partial English translation).

"Science of Gulicide", $1^{st}$ Edition, Asakura Publishing, 1996, extracted page (partial English translation).

"Basis of Glucose Chemistry", $1^{st}$ Edition, Kodansya Scientific, 1984, pp. 4, 5, 10, 11, 92 and 93 (partial English translation).

Test Report (dated Feb. 3, Heisei 12 2000)), by Japan Food Research Laboratories, pp. 1–4 and annexed papers 4 pages in total (English translation).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 5 and 6 are added and determined to be patentable.

*5. A mannose-containing feed comprising:*

*a feed, and*

*a mannose-containing copra meal in an amount of 0.01–2% by weight of the feed,*

*said mannose-containing copra meal containing 3–30% by weight of mannose,*

*said mannose-containing copra meal being obtained by a process comprising the steps of treating each 1 g of copra with 1-100 units of a hemicellulase solution of a 3-fold or less amount by weight relative to the copra meal,*

*wherein at least part of mannan in the copra meal is degraded by the hemicellulase to release mannose contained in the copra meal.*

*6. A process for producing a mannose-containing feed, comprising the steps of:*

*treating each 1 g of copra meal with 1–100 units of a hemicellulase solution of 3-fold or less amount by weight relative to the copra meal,*

*wherein at least part of mannan in the copra meal is degraded by the hemicellulase to release mannose contained in the copra meal, to obtain a mannose-containing copra meal containing 3–30% by weight of mannose, and*

*mixing the mannose-containing copra meal with feed to obtain a mannose-containing feed which contains the mannose-containing copra meal in an amount of 0.01–2% by weight of the feed.*

* * * * *